(12) United States Patent
Marcantonio

(10) Patent No.: US 11,525,524 B2
(45) Date of Patent: Dec. 13, 2022

(54) MAGNETICALLY-OPERABLE SHUTTER ASSEMBLY

(71) Applicant: CEME S.P.A., Trivolzio (IT)

(72) Inventor: Vincenzo Marcantonio, Carbonate (IT)

(73) Assignee: CEME S.P.A., Trivolzio (IT)

( * ) Notice: Subject to any disclaimer, the term of this patent is extended or adjusted under 35 U.S.C. 154(b) by 268 days.

(21) Appl. No.: 16/968,746

(22) PCT Filed: Feb. 12, 2018

(86) PCT No.: PCT/IT2018/000020
§ 371 (c)(1),
(2) Date: Aug. 10, 2020

(87) PCT Pub. No.: WO2019/155500
PCT Pub. Date: Aug. 15, 2019

(65) Prior Publication Data
US 2021/0010612 A1   Jan. 14, 2021

(51) Int. Cl.
*F16K 31/40* (2006.01)
*F16K 31/06* (2006.01)
*F16K 31/08* (2006.01)

(52) U.S. Cl.
CPC ........ *F16K 31/404* (2013.01); *F16K 31/0675* (2013.01); *F16K 31/0693* (2013.01); *F16K 31/082* (2013.01)

(58) Field of Classification Search
CPC . F16K 31/0675; F16K 31/0693; F16K 31/082
See application file for complete search history.

(56) References Cited

U.S. PATENT DOCUMENTS

| 6,076,550 | A | 6/2000 | Hiraishi et al. |
| 6,701,744 | B1 | 3/2004 | Yajima et al. |
| 7,703,740 | B1* | 4/2010 | Franklin ............... F16K 31/404 |
| | | | 251/39 |
| 7,866,625 | B2 | 1/2011 | Lee et al. |
| 8,960,638 | B2* | 2/2015 | Da Pont ............... F16K 31/404 |
| | | | 251/30.03 |
| 2006/0027774 | A1 | 2/2006 | Acar et al. |
| 2009/0095928 | A1 | 4/2009 | Lee et al. |

FOREIGN PATENT DOCUMENTS

| DE | 1227299 | 10/1966 |
| DE | 202005004205 | 10/2005 |
| EP | 0791939 | 8/2003 |
| FR | 2493465 | 5/1982 |
| WO | 0070276 | 11/2000 |
| WO | 2010090606 | 8/2010 |
| WO | 2012038897 A1 | 3/2012 |

\* cited by examiner

*Primary Examiner* — Eric Keasel
(74) *Attorney, Agent, or Firm* — Pearne & Gordon LLP

(57) ABSTRACT

A magnetically-operable shutter assembly comprises a fixed core and a movable core which can be configured between a contact condition and a condition of the utmost mutual distance and further comprises an encapsulation body capable of simultaneously containing the fixed core and the movable core; the encapsulation body can be installed within a body of a complex functional assembly which is configurable at least in a hindrance configuration for a fluid flow and in an admittance configuration for said fluid flow through the complex functional assembly itself.

15 Claims, 3 Drawing Sheets

Figure 3:
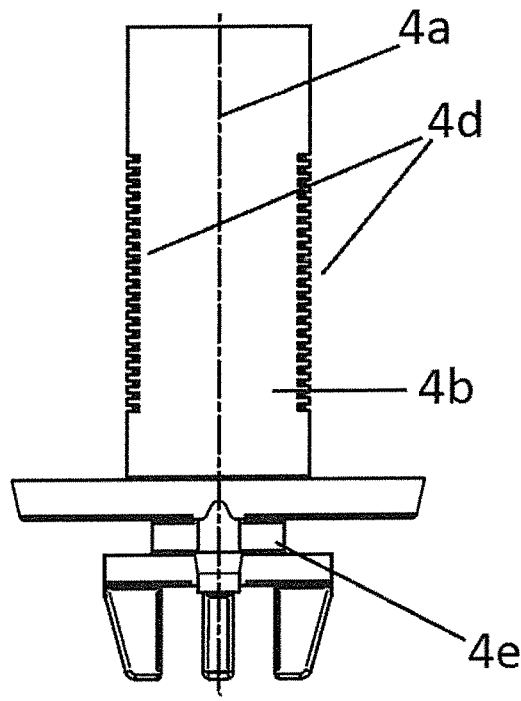

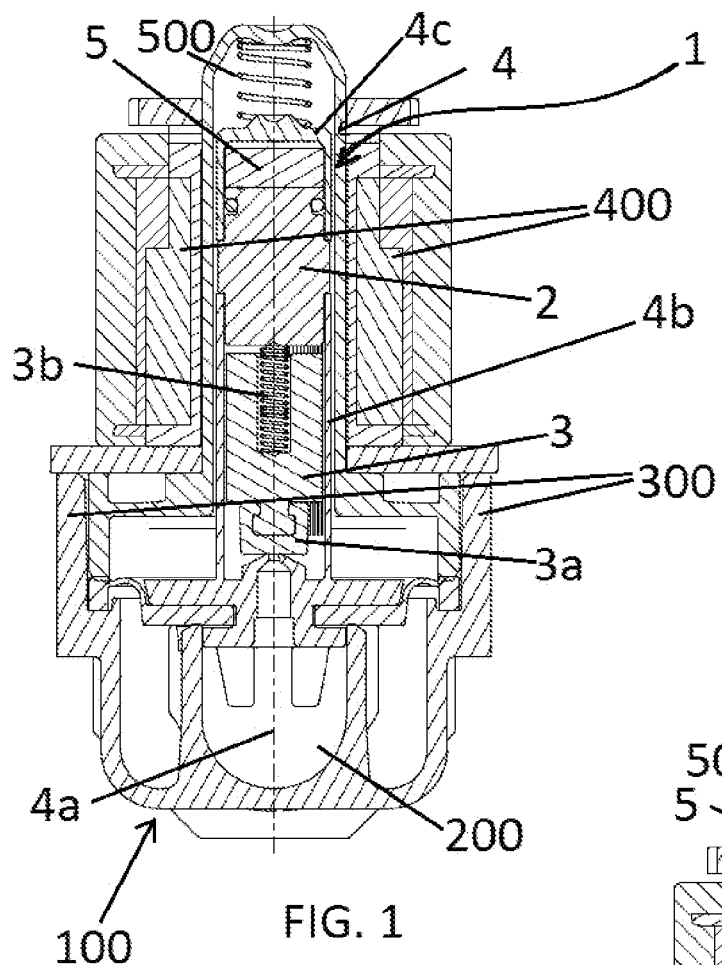
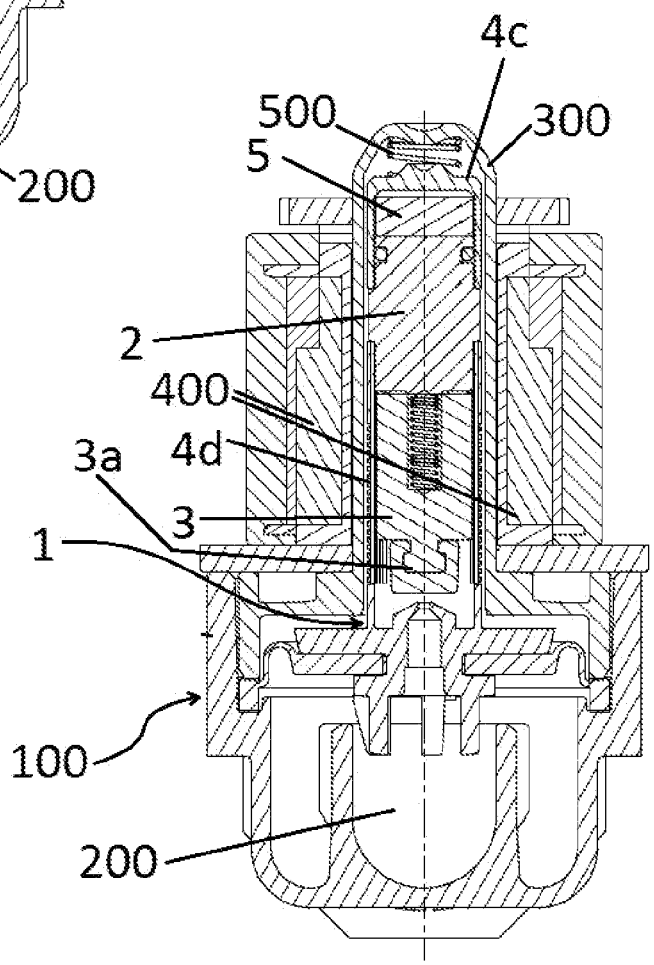

MAGNETICALLY-OPERABLE SHUTTER ASSEMBLY

The present invention relates to a shutter assembly, which can be installed in devices such as electro-valves (but also, if needed, in "oscillating slider" electro-pumps or any other electromagnetically operated hydraulic or pneumatic device), as well as an electromagnetically operated valve, belonging, but not being limited, to the "bistable" type, equipped with such shutter assembly.

As it is known, many valves in hydraulic or pneumatic systems are operated by means of a variable electromagnetic field, which is modulated in the most suitable way in order to make a magnetically sensitive shutter move inside it: the modulation or, in any case, the driving of this shutter can be carried out by controlling the current in a solenoid, which generates and/or varies the magnetic field itself in the most suitable ways and times.

To ensure a proper operation and a sufficient level of precision, response speed, controllability and reliability, solenoid valves (or "electro-valves", as known in the relevant art) must be carefully designed, even and especially in those cases when the extremely small size and the modulation intervals of the fluid flow controlled by these valves are particularly limited: in this regard, it should be noted that the known valve structures, despite having currently achieved a considerable degree of functional integration, have several drawbacks, firstly in terms of mass manufacturability and compacting/miniaturization of their size.

Among the drawbacks of these known structures, the manufacturing problems of the valve shutters can be notably mentioned: these structural parts often need to be dimensioned with extreme care, especially when very compact or very fast operated valves are provided: the dimensioning raises many critical issues, even when the strokes of these shutters must be very short (approximately, strokes lower than 10 mm of relative motion), because in that case the "parasitic" magnetic effects or the non-uniformities of the magnetic field—e.g. due to imperfections in the distribution of the magnetic material or to variabilities located in the space of the field itself—can lead to the blockage of the shutter or to opening/closing which is unwanted and not synchronized with the commands given by the operator to the valve.

The aforementioned problems related to a safe, controlled and repeatable handling worsen, in terms of occurrence and consequent effects on the operation of the system, when "bistable" valves are used: these valves in fact have operating cycles that are almost constantly linked to the presence and modulation of the electromagnetic field, hence the chances to have wrong commands, missing movements or unsynchronized movements of the shutter in the valve body grow remarkably.

Furthermore, the known shutter assemblies may be subject to "galling by depression"-related problems, when for example they are in contact with a fixed part of the valve and, despite having received a pulse to move by electromagnetic stimulation, this impulse is not sufficient to overcome the "vacuum" effect that is created between the surfaces in contact (or, in other words, that adhesion effect by depression existing between the movable part of the shutter and the fixed part with which it is in contact until a sufficient quantity of fluid which must pass through the valve insinuates between these two mutually contacting structural parts).

Furthermore, a drawback of the known shutters is due to the accumulation of calcareous precipitations which may interpose between the different parts in relative motion of the shutter with respect to the rest of the valve and, once again, cause galling/blocking and/or excessive wear of components: these drawbacks are even more recurring and serious in all those valves or electro-valves where a certain stagnation of fluid is always present (and, typically, in the valves for industrial/civil or domestic taps, where the fluid on which the valve works consists of non-distilled water) inside the valve body itself.

Compared to the prior art and to the problems mentioned above, the object of the present invention is therefore to provide a shutter assembly which can be installed in different types of valves (and especially of electro-valves, including but not limited to the "bistable" ones) able to overcome the aforementioned drawbacks and to be at the same time very easy and cheap to design and manufacture massively.

More specifically, the object of the present invention is to implement a shutter assembly able to ensure always an optimal operation (in terms of both exerted stress and precision of the command, and also in terms of compactness of the stroke) with a resulting precision, speed and infinite repeatability of the commands that can be given to the valve.

Furthermore, an object of the present invention is to devise a shutter assembly which is highly universal, i.e. can be easily mounted on a wide range of complete products (e.g. on valves or pumps), which in turn can be mounted in very different hydraulic or pneumatic circuits, in turn, such valves (or pumps) may be of any size, even particularly small, and may be able to define the strokes of the shutter assembly itself of any size.

Figure 4:
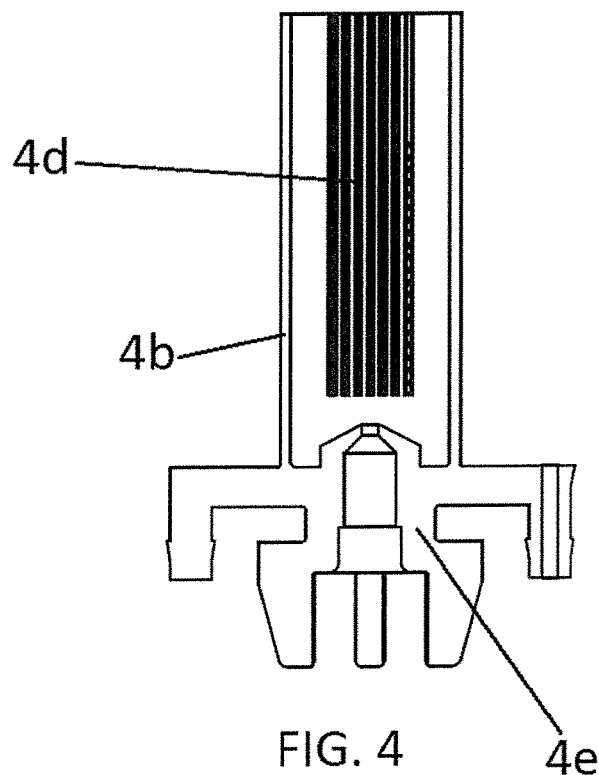
Figure 5:
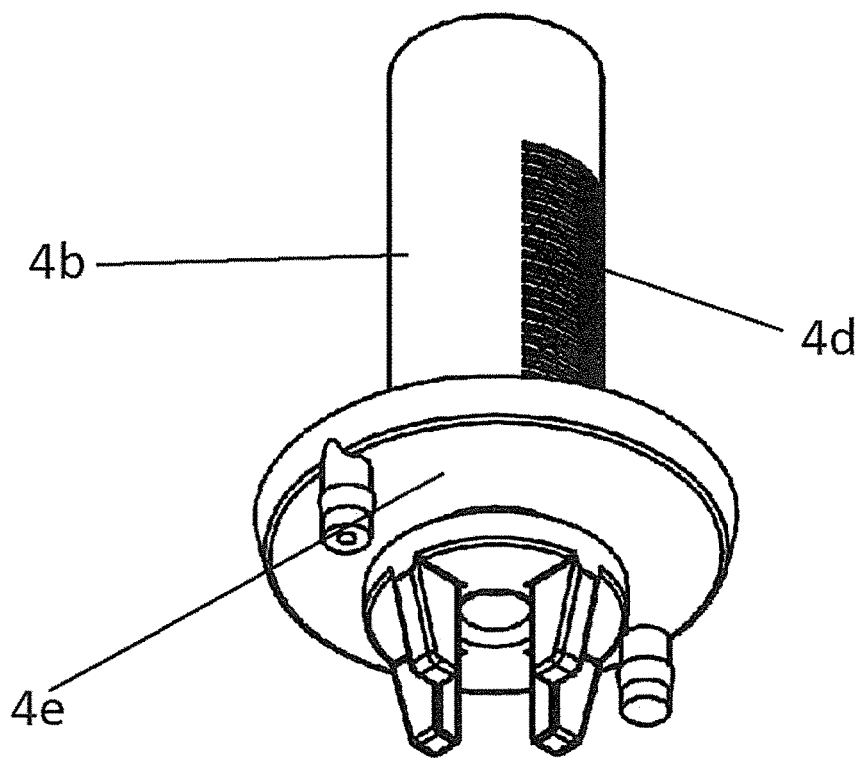
Figure 6:
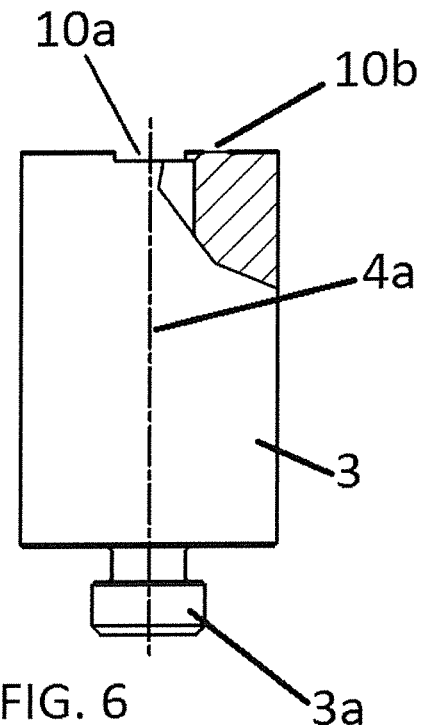
Figure 7:
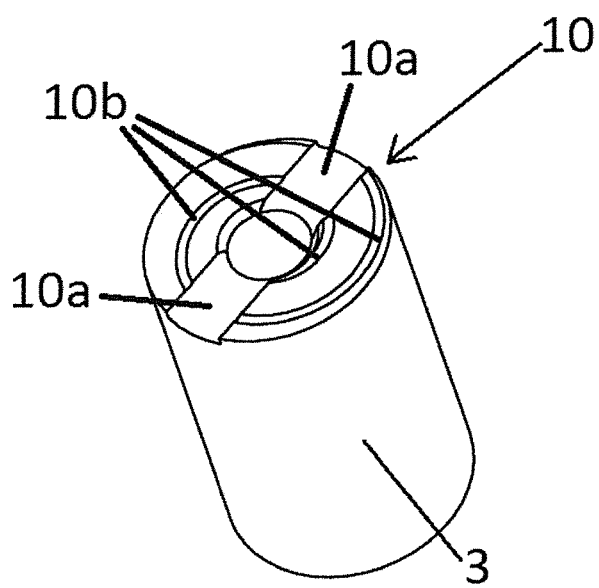
Figure 8:
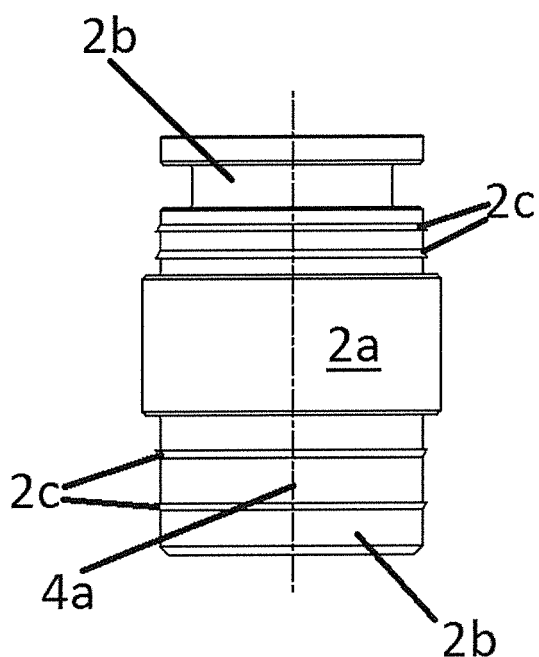
Figure 9:
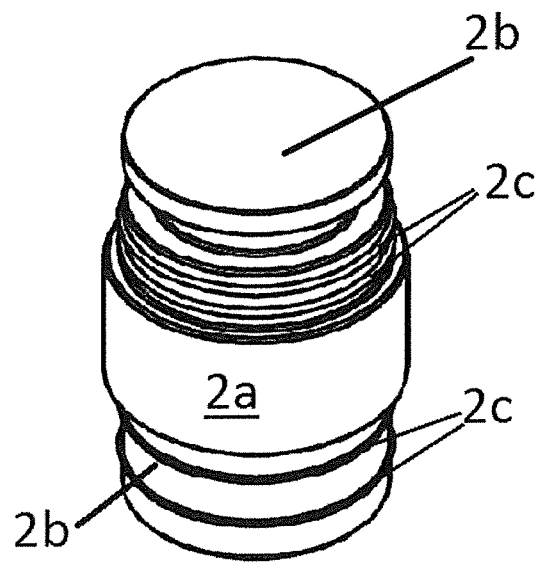

It is now described, by way of a non-limiting example, an embodiment of the shutter assembly magnetically operable according to the invention, as shown in the accompanying figures, wherein:

FIGS. 1 and 2 show in sequence sections of a valve (by way of a non-limiting example, a "solenoid electromagnetically-operated bistable" one) comprising the shutter assembly according to the invention and in different operating configurations; and FIGS. 3, 4 and 5 show different (perspective and sectional) views of a single component of the shutter assembly according to the invention; and FIGS. 6, 7, 8 and 9 show different (perspective and sectional) views of another single component of the shutter assembly according to the invention.

The magnetically operable shutter assembly of the present invention is a shutter assembly, as previously mentioned, which can be associated with electro-valves (and/or with oscillating electro-pumps, and so on) and from the structural point of view essentially comprises a fixed core 2 and a movable core 3 mutually configurable between a first condition of mutual contact (or, in any case, of the utmost mutual proximity) and a second condition of the utmost mutual distance: such fixed and movable cores 3 can be moved relative to each other by induction and/or modulation and/or variation of an electromagnetic field.

Advantageously, the shutter assembly according to the invention further comprises an encapsulation body 4, which is capable of simultaneously containing the fixed core 2 and the movable core 3: the encapsulation body 4 can in turn be installed inside a body of a complex functional assembly 100 (which typically may be a valve, e.g. a monostable or bistable electro-operated one, or a pump) and is reversibly configurable at least in one hindrance configuration for a fluid flow and in an admittance configuration for said fluid flow through the complex functional assembly 100 itself.

From structural details and referring to the accompanying figures, it can be noticed that the encapsulation body 4 is a substantially prismatic or cylindrical body and defines a development axis 4a along which at least the fixed core 2 and/or the movable core 3 are arranged: around this development axis 4a a delimitation wall 4b (which will be detailed below) develops to contain at least part of the fixed core 2 and/or the movable core 3, while a top wall 4c is placed at an end of the delimitation wall 4b along the development axis 4a.

In order to properly operate with the right sensitivity and proper handling degree, there may be provided a permanent magnet 5 circuitally associated, from an electromagnetically point of view, to the fixed core 2 and/or to the movable core 3: this permanent magnet 5 may be housed within the encapsulation body 4 (e.g. near the top wall 4c).

Referring back to the fixed core 2 and to the mobile core 3, it can be seen how these components define, upon the occurrence their "first condition" of the utmost mutual proximity or adjacency/contact, a mutual adjacency along the development axis 4a while defining, upon the occurrence of the second condition of the utmost relative distance, a driving stroke of 0.3 to 0.8 mm and preferably of 0.5 mm.

In order to guarantee a high reliability and constant operation even in the presence of impurities or particularly hostile chemical and physical conditions of the working fluid with which the shutter assembly 1 comes into contact (e.g., while operating with water particularly rich in salts and/or in any case predisposed to the precipitation of insoluble calcareous salts), the encapsulation body 4 can conveniently comprise suitable filtration and/or retention means 4d of impurities and/or insoluble saline compounds: these filtration and/or retention means 4d are formed, with reference to the embodiment of the invention illustrated in the figures, on the delimitation wall 4b and/or on the top wall 4c so as to permit the passage and permeation of the working fluid in the various internal spaces and/or interstices of the shutter assembly (thus ensuring the development of the hydrostatic pressure differentials which make the shutter itself functional in the most common valve and/or pump schemes).

Again with reference to the figures, it can be seen that the filtration and/or retention means 4d can comprise a plurality of through holes formed in the delimitation wall 4b preferably according to a matrix scheme: nonetheless, other possible distribution schemes of these through holes are possible depending on the current operational needs.

According to a further feature of the invention, there can also be provided separation facilitating means 10 operatively active between the fixed core 2 and the movable core 3: such separation facilitating means 10 promote precisely the splitting of the two cores when they are in contact (or when they are adjacent to each other) and can typically comprise a transverse groove 10a formed on the faces of the fixed core 2 and/or of the movable core 3 placed adjacent to each other upon the occurrence the first condition.

Conveniently, in order to increase the ease of separation of the two cores 2 and 3 and therefore in order to make the change of operating condition of the shutter assembly 1 as much precise and repeatable as possible, the separation facilitating means 10 may also comprise a predetermined number of removal lines 10b obtained according to a predetermined geometric pattern (for example and as shown in the figures, a pattern made of concentric circles or according to a spiraling pattern): this pattern is calculated at the design stage so that these removal lines 10b are adapted, either by themselves or in cooperation with the aforementioned groove 10a, to determine a certain (numeric) ratio between actual physical surfaces in actual contact conditions of said faces of the fixed core 2 and/or of the movable core 3 placed adjacent to each other upon the occurrence the "first condition" and ideal geometric surfaces of the faces of the fixed core 2 and/or of the movable core 3 placed adjacent to each other—still upon the occurrence of the aforementioned "first condition".

Conveniently, the aforementioned ratio between surfaces will be equal to or less than 40%.

Focusing now on an additional structural feature of the invention, it can be noticed that the encapsulation body 4 further comprises a base portion 4e operatively operable on a canalisation duct 200 (detailed below) of the "complex functional assembly 100" into which the shutter assembly 1 can be operatively inserted: the function of this base portion 4e is to selectively determine the fluid flow hindrance and/or admittance conditions in the complex functional assembly 100.

With reference to the presence of the movable core 3, it should be noticed that the latter is active on the base portion 4e for separating and/or for connecting hydraulically and/or pneumatically the shutter assembly 1 with respect to the canalisation duct 200, whereas as far as the movable core 3 is concerned, it can be seen that the latter comprises a head 3a capable of defining, in cooperation with the base portion 4e of the encapsulation body 4, a passage opening capable of separating and/or connecting hydraulically and/or pneumatically the shutter assembly 1 with respect to the canalisation duct (200).

Furthermore, it can be noticed that the movable core 3 further comprises an elastic contrast element 3b capable of moving the movable core 3 at least in the condition of the utmost distance with respect to the fixed core 2 (such an elastic contrast element 3b may conveniently be an axial spring operating by traction or compression, according to the possible working modalities of the shutter assembly and/or the different types of valves in which the assembly is mounted).

Still, as far as the fixed core 2 is concerned, the presence of a central portion 2a of this component must be noticed: this central portion 2a can conveniently be capable of defining a lateral surface being cooperatively flush with said delimitation wall 4b (as seen in the example of the accompanying figures) under assembling conditions of the shutter assembly (1), while two corresponding end portions 2b protruding from said central portion 2a and capable of being included and/or inscribed within the delimitation wall 4b and/or within the top wall 4c of the encapsulation body 4 may also be provided.

If the fixed core 2 has the exemplary configuration described above, suitable engagement means 2c—typically of the reversible type—active between the end portions 2b and the delimitation wall 4b and/or the top wall 4c may also be provided: such engagement means preferably comprise coronal protuberances with a tapered section capable of defining a connection by mechanical interference between the fixed core 2 and the encapsulation body 4.

The object of the present invention is also a complex functional assembly, generally indicated with the numeral reference 100 in the accompanying figures and typically—but not exclusively—of the "electro-valve" or "electro-pump" type (e.g., this complex functional assembly may be a so-called "bistable electro-valve"): this complex functional assembly 100 basically comprises:

a flow canalisation 200 which can be crossed by a fluid flow (e.g., a working fluid for pneumatic or hydraulic systems or even just the tap water in plumbing electro-valves and electro-valves with similar applications); and a housing 300 for a shutter assembly 1 operatively active on the aforementioned flow canalisation 200 to vary one or more physical parameters thereof; and an electromagnetic excitation element 400 which can be activated on the fixed core 2 and/or on the movable core 3 and/or on the permanent magnet 5 or more generally on the shutter assembly 1.

Advantageously, the housing 300 of such a complex functional assembly 100 is capable of hosting an encapsulation body 1 according to what has been described hitherto and/or according to what is claimed hereinafter.

In terms of functional cooperation with the shutter assembly 1, it should be noticed that the complex functional assembly 100 is reversibly configurable at least between the following configurations:

a "hindrance" configuration corresponding to the second condition of the utmost mutual distance between the fixed core 2 and the movable core (3) (in this hindrance condition, the flow of the fluid in the canalisation 200 is blocked); and an "admittance" configuration corresponding to the first condition of the mutual contact or utmost proximity between the fixed core 2 and the movable core 3 (in this admittance condition, instead, the flow of the fluid in the canalisation 200 is allowed).

From a structural point of view, the encapsulation body 1 is slidably engaged in the housing 300 and defines an adjustment stroke of 5 to 9 mm, said adjustment stroke being preferably proportional according to a ratio of at least 10:1 with respect to said driving stroke of the shutter assembly 1: the present invention thereby succeeds in obtaining large and accurate (but, especially, the most reliable!) valve closing and opening, by exploiting a very limited relative stroke between the fixed core 2 and the movable core 3.

Finally, it can be noticed that in the complex functional assembly 100 suitable contrast means 500 (also implemented by tension or compression axial springs, according to the current needs) may also be provided, being capable of moving the encapsulation body 1 at least in said fluid flow hindrance configuration.

The invention allows to obtain several advantages over the known art.

First of all, thanks to the peculiar structural architecture—and to the consequent possibility of assembling a resulting valve and/or a pump—the overall size of the end product can be minimised, while ensuring a considerable reliability of operation (also in the presence of non-uniformity of the magnetic field and/or of the materials used as permanent magnets) and an easy and cheap mass manufacturing.

Furthermore, the particular choice of components and relative sizing of the various parts of the shutter assembly allows to greatly increase the degree of "solidity" and application versatility (and that further increases the cost effectiveness in terms of large-scale production).

At the same time, the presence and the particular geometry/topology of the various structural components of the shutter assembly allow to call off the effects of "depression blockage" very often occurring on the so-called "movable cores" of the known valves, and, at the same time, they prevent calcareous deposits from interposing in critical areas for the operation of the shutter assembly and/or for the operation of the entire device (valve or pump) in which the shutter assembly is installed.

It is finally evident that to the object of the present invention modifications or additions can be applied, which are obvious to a person skilled in the art, without departing from the scope of protection provided by the appended claims.

The invention claimed is:

1. Magnetically-operable shutter assembly associable with electro-valves and/or electro-pumps, comprising:
   a fixed core (2) and a movable core (3) mutually configurable between a first condition of contact or of the utmost mutual proximity and a second condition of the utmost mutual distance, said fixed core (2) and movable core (3) being movable relative to each other by induction and/or modulation and/or variation of an electromagnetic field, and
   an encapsulation body (4) capable of simultaneously containing the fixed core (2) and the movable core (3), said encapsulation body (4) being in turn capable of being installed inside a body of a complex functional assembly (100),
   wherein the encapsulation body (4) is a substantially prismatic or cylindrical body and defines:
   a development axis (4a) along which at least the fixed core (2) and/or the movable core (3) are arranged;
   a delimitation wall (4b) extending around said development axis (4a) and capable of containing at least part of the fixed core (2) and/or the movable core (3); and
   a top wall (4c) placed at one end of said delimitation wall (4b) along said development axis (4a);
   and wherein the encapsulation body (4) further comprises filtration and/or retention means (4d) of impurities and/or insoluble saline compounds, said filtration and/or retention means (4d) being formed on the delimitation wall (4b) and/or on the top wall (4c).

2. Shutter assembly according to claim 1, wherein a permanent magnet (5) circuitally associated, from the electromagnetic point of view, with the fixed core (2) and/or with the movable core (3) is also provided, said permanent magnet (5) being housed within the encapsulation body (4).

3. Shutter assembly according to claim 1, wherein the fixed core (2) and the movable core (3) define:
   upon the occurrence of said first condition, a mutual adjacency along the development axis (4a); and/or
   upon the occurrence of said second condition, a driving stroke comprised in a range from 0.3 to 0.8 mm.

4. Shutter assembly according to claim 3, wherein the fixed core (2) and the movable core (3) define, upon the occurrence of said second condition, a driving stroke of 0.5 mm.

5. Shutter assembly according to claim 1, wherein said filtration and/or retention means (4d) comprise a plurality of through holes formed in the delimitation wall (4b), said through holes being located according to a matrix scheme.

6. Shutter assembly according to claim 1, wherein separation facilitating means (10) operatively active between the fixed core (2) and the movable core (3) are also provided, said separation facilitating means (10) comprising:
   a transverse groove (10a) formed on the faces of the fixed core (2) and/or of the movable core (3) placed adjacent to each other upon the occurrence of said first condition; and/or
   a predetermined number of removal lines (10b) obtained according to a predetermined geometric pattern, said geometric pattern being made of concentric circles or according to a spiralling pattern,
   the separation facilitating means (10) being capable of determining a ratio between real physical surfaces in actual contact conditions of said faces of the fixed core (2) and/or of the movable core (3) placed adjacent to each other upon the occurrence of said first condition and ideal geometrical surfaces of the faces of the fixed core (2) and/or of the movable core (3) placed adjacent to each other upon the occurrence of said first condition, said ratio being equal to or less than 40%.

7. Shutter assembly according to claim 1, wherein the encapsulation body (4) further comprises a base portion (4*e*) which can be operatively activated on a canalisation duct (200) of said complex functional assembly (100) to selectively determine said fluid flow hindrance and/or admittance conditions, the movable core (3) being active on said base portion (4*e*) for separating and/or for connecting hydraulically and/or pneumatically the shutter assembly (1) with respect to said canalisation duct (200).

8. Shutter assembly according to claim 1, wherein the movable core (3) comprises a head (3*a*) capable of defining, in cooperation with the base portion (4*e*) of the encapsulation body (4), a passage opening capable of separating and/or connecting hydraulically and/or pneumatically the shutter assembly (1) with respect to said canalisation duct (200).

9. Shutter assembly according claim 1, wherein the movable core (3) further comprises an elastic contrast element (3*b*) capable of moving the movable core (3) at least in the condition of the utmost distance with respect to the fixed core (2).

10. Shutter assembly according to claim 1, wherein the fixed core (2) comprises a central portion (2*a*) capable of defining a lateral surface being cooperatively flush with said delimitation wall 4*b* under assembling conditions of the shutter assembly (1) and two corresponding end portions 2*b* protruding from said central portion (2*a*) and capable of being included and/or inscribed within the delimitation wall (4*b*) and/or within the top wall (4*c*) of the encapsulation body (4).

11. Shutter assembly according to claim 10, wherein reversible-type engagement means are provided between said end portions (2*b*) and the delimitation wall (4*b*) and/or the top wall (4*c*), said engagement means comprising coronal protuberances with a tapered section capable of defining a connection by mechanical interference between the fixed core (2) and the encapsulation body (4).

12. Shutter assembly (100) according to claim 11, wherein contrast means (500) capable of moving the encapsulation body (1) at least in said fluid flow hindrance configuration are also provided.

13. A complex functional assembly (100), of an "electro-valve" type or of an "electro-pump" type or of an "bistable electro-valve" type, said complex functional assembly (100) comprising:
    a flow canalisation (200) which can be crossed by a fluid flow; and
    a housing (300) for a shutter assembly (1) operatively active on said flow canalisation (200) to vary one or more physical parameters of said fluid flow; and
    an electromagnetic excitation element (400) which can be activated on the fixed core (2) and/or on the movable core (3) and/or on the permanent magnet (5) of the shutter assembly (1), characterized in that said housing (300) is capable of hosting an encapsulation body (1) according to claim 1, the complex functional assembly (100) being reversibly configurable at least:
    in said hindrance configuration in correspondence with said second condition of the utmost mutual distance between the fixed core (2) and the movable core (3); and
    in said admittance configuration in correspondence with said first condition of contact or of the utmost mutual proximity between the fixed core (2) and the movable core (3).

14. A complex functional assembly according to claim 13, wherein said encapsulation body (1) is slidably engaged in the housing (300) and defines an adjustment stroke comprised between 5 and 9 mm.

15. A complex functional assembly according to claim 14, wherein said adjustment stroke is proportional according to a ratio of at least 10:1 with respect to said driving stroke of the shutter assembly (1).

\* \* \* \* \*